United States Patent
Okuno et al.

(10) Patent No.: US 6,541,575 B2
(45) Date of Patent: Apr. 1, 2003

(54) PROCESS FOR PRODUCING AN EPOXIDIZED POLYMER

(75) Inventors: Taketoshi Okuno, Kurashiki (JP); Hideharu Iwasaki, Kurashiki (JP); Takuo Tsuruta, Kamisu-machi (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/024,240

(22) Filed: Dec. 21, 2001

(65) Prior Publication Data

US 2002/0082348 A1 Jun. 27, 2002

(30) Foreign Application Priority Data

Dec. 21, 2000 (JP) .......................... 2000-388509

(51) Int. Cl.$^7$ ................................. C08F 8/08
(52) U.S. Cl. ................. 525/340; 525/331.7; 525/331.9; 525/332.1; 525/392.8; 525/352.4; 525/333.1; 525/333.2; 525/387
(58) Field of Search ................. 525/340, 387

(56) References Cited

U.S. PATENT DOCUMENTS 5,789,512 A  8/1998  Fan et al.

FOREIGN PATENT DOCUMENTS

| JP | 05-247016 | 9/1993 |
| JP | 05-247120 | 9/1993 |
| WO | WO 98/28338 | 7/1998 |
| WO | WO 98/45349 | 10/1998 |

OTHER PUBLICATIONS

Derwent Publications, AN 1995–110666, JP 07 033819, Feb. 3, 1995.
Derwent Publications, AN 1985–119675, JP 60 060123, Apr. 6, 1985.
Derwent Publications, AN 1993–339772, JP 05 247120, Sep. 24, 1993.
Jian et al, "Catalytic Epoxidation of Styrene–Butadiene Triblock Copolymer with Hydrogen Peroxide", Journal of Polymer Science: Part A: Polymer Chemistry, vol. 29, 1991, pp 1183–1189.
Kurusu, "Functionalization of Polymers: Epoxidation of Polyolefins", Polymers for Advanced Technologies, vol. 7, 1996, pp 67–72.
Venturello et al, "A New, Effective Catalytic System for Epoxidation of Olefins by Hydrogen Peroxide Under Phase–Transfer Conditions", Journal of Organic Chemistry, vol. 48, No. 21, 1983, pp 3831–3833.
Venturello et al, "Quaternary Ammonium Tetrakis (Diperoxotungsto) Phosphates (3–) as a New Class of Catalysts for Efficient Alkene Epoxidation with Hydrogen Peroxide", Journal of Organic Chemistry, vol. 53, No. 7, 1988, pp 1953–1957.
Ishi et al, "Hydrogen Peroxide Oxidation Catalyzed by Heteropoly Acids Combined with Cetylpyridinium Chloride: Epoxidation of Olefins and Allylic Alcohols, Ketonization of Alcohols and Diols, and Oxidative Cleavage of 1,2–Diols and Olefins", Journal of Organic Chemistry, vol. 53, No. 15, 1988, pp 3587–3593.
Duncan et al, "Mechanism and Dynamics in the $H_3[PW_{12}O_{40}]$–Catalyzed Selective Epoxidation of Terminal Olefins by $H_2O_2$. Formation, Reactivity, and Stability of $\{PO_4[WO(O_2)_2]_4\}^{3-}$", Journal of American Chemical Society, vol. 117, No. 2, 1995, pp 681–691.
Jian et al, "Epoxidation of Unsaturated Polymers with Hydrogen Peroxide", Journal of Polymer Science: Part C: Polymer Letters, vol. 28, 1990, pp 285–288.
Jian et al, "Catalytic Epoxidation of Polysobutylene–co–Isoprene with Hydrogen Peroxide", Journal of Polymer Science: Part A: Polymer Chemistry, vol. 29, 1991, pp 547–553.
Salles et al, "$^{31}P$ and $^{183}W$ NMR Spectroscopic Evidence for Novel Peroxo Species in the "$H_3[PW_{12}O_{40}]\cdot yH_2O/H_2O_2$", System, Synthesis and X–Ray Structure of Tetrabutylammonium ($\mu$–Hydrogen Phosphato)bis($\mu$–peroxo)bis(Oxoperoxotungstate) (2–): A Catalyst of Olefin Epoxidation in a Biphase Medium", Inorganic Chemistry, vol. 33, No. 5, 1994, pp 871–878.
Aubry et al, "Reinvestigation of Epoxidation Using Tungsten–Based Precursors and Hydrogen Peroxide in a Biphase Medium", Inorganic Chemistry, vol. 30, No. 23, 1991, pp 4409–4415.

*Primary Examiner*—Bernard Lipman
(74) *Attorney, Agent, or Firm*—Oblon, Spivak, McClelland, Maier & Neustadt, P.C.

(57) ABSTRACT

According to the present invention, provided is an industrially advantageous process for producing an epoxidized polymer, with safety and efficiency, wherein the epoxidation of a polymer having an olefinic carbon-carbon double bond is effected under the presence of substantially no alkali metal ion by adding an aqueous solution containing (i) ammonium tungstate and/or tungstophosphoric acid and (ii) phosphoric acid, in which the amount of (ii) phosphoric acid is not less than 0.25 moles relative to 1 gram atom of tungsten atom contained in the (i) ammonium tungstate and/or tungstophosphoric acid, and an aqueous hydrogen peroxide, separately to a solution of said polymer and a quaternary ammonium salt in an organic solvent immiscible with water.

6 Claims, No Drawings

PROCESS FOR PRODUCING AN EPOXIDIZED POLYMER

BACKGROUND OF THE INVENTION

1. Field of the Invention

The present invention relates to a process for producing an epoxidized polymer. The polymer obtained by the process of the present invention is useful as a starting material for a ultraviolet-curing resin for sealant or coating use, and as an adhesive.

2. Description of the Related Art

Epoxidation of a polymer having an olefinic carbon-carbon double bond is a convenient method to produce a polymer with an epoxy group.

As an example of such a method, epoxidation of a polymer having an olefinic carbon-carbon double bond with a peroxy acid such as performic acid is known [See "Polymers for Advanced Technologies, Vol. 7, pp. 67–72 (1996)"]. However, peroxy acids are comparatively expensive. Also, epoxidation with a peroxy acid has a problem that the epoxy group in the epoxidized polymer formed may be subjected to ring cleavage with acids such as formic acid which are present in the reaction mixture.

As other examples of epoxidation of a polymer having an olefinic carbon-carbon double bond, epoxidation with hydrogen peroxide, which is more economical, is described, for example, in the following documents [1] to [4].

[1] "Journal of Polymer Science: Part A: Polymer Chemistry, 29, 1183–1189 (1991)" [hereinafter abbreviated as "document 1"] describes a process for epoxidation of a styrene-butadiene-styrene triblock copolymer with hydrogen peroxide and trioctylmethylammonium tetrakis (diperoxotungsto)phosphate, which is isolated from the reaction mixture prepared by adding phosphoric acid and trioctylmethylammonium chloride to the mixture of tungstic acid and hydrogen peroxide.

[2] U.S. Pat. No. 5,789,512 [hereinafter abbreviated as "document 2"] describes a process for epoxidizing unsaturated polymers comprising reacting a unsaturated polymer with hydrogen peroxide in the presence of (a) tungstic acid or its metal salts, (b) phosphoric acid or its metal salts and (c) at least one phase transfer catalyst.

[3] Japanese Patent Application Laid-open No. Hei 5-247016 (JP 247016/1993) [hereinafter abbreviated as "document 3"] describes a process for producing epoxidized glycidyl esters comprising epoxidizing glycidyl esters having cyclohexene rings with hydrogen peroxide by using a system composed of (a) one or more oxidation catalysts selected from tungstic acids and molybdenic acids, (b) long-chain alkyl group-containing quaternary ammonium salts or long-chain alkyl group-containing phosphonium salts and (c) phosphate anions as a catalyst.

[4] Japanese Patent Application Laid-open No. Hei 5-247120 (JP 247120/1993) [hereinafter abbreviated as "document 4"] describes a process for producing a dicyclopentadieneepoxy (meth)acrylate polymer by the epoxidation of dicyclopentadiene (meth)acrylate polymer with hydrogen peroxide, a phosphoric acid compound, a tungstic acid compound and an onium salt, in a two phase system.

However, in the method indicated in document 1, trioctylmethylammonium tetrakis(diperoxotungsto)phosphate, that is an oxo complex of tungsten, must be isolated before the epoxidation step. This makes the total procedures complicated. In addition, the preparation step of the oxo complex and the epoxidation step both require, as a solvent, a halogenated hydrocarbon, which is considered to have a negative impact on the environment.

Document 2 shows no details of the procedures for mixing of each component used in the epoxidation reaction. Document 2 only describes, in the "Examples 1 to 3", processes for producing epoxidized polybutadiene having epoxy values of 182.7 mgKOH/g (Example 1), 183.3 mgKOH/g (Example 2) and 172.8 mgKOH/g (Example 3). However, in these examples, only about 20% of the double bonds of polybutadiene were epoxidized. The present inventors tried to make the ratio of epoxidized double bonds of polybutadiene higher according to the description of document 2, but only observed the gelation of the reaction mixture and failed to obtain an epoxidized polybutadiene. Moreover, in the method described in the "Examples" of document 2, considerable amount of oxygen was generated due to decomposition of hydrogen peroxide. For this reason, it is necessary to use hydrogen peroxide in a large amount. This causes a problem of safety.

Document 3 describes, in its "Examples", an epoxidation method wherein an aqueous solution of a salt of tungstic acid and phosphoric acid, the pH of which had been adjusted using sodium carbonate, was added to the solution of a substrate and a quaternary ammonium salt in an organic solvent, followed by the addition of an aqueous hydrogen peroxide under agitation. However, the alkali metal ion present in the reaction mixture promotes a decomposition of hydrogen peroxide. For this reason, it is necessary to use hydrogen peroxide in a large amount. This causes a problem of safety. The present inventors tried to apply the epoxidation method of the document 3 to a polymer having no cyclohexene ring moiety and found that, when a compound of high molecular weight was used as a substrate, gelation of the reaction mixture occurred and no epoxidized polymer was obtained.

Document 4 describes an epoxidation method wherein a solution of an onium salt in a water insoluble organic solvent was mixed with an aqueous hydrogen peroxide containing a phosphoric acid compound and a tungstic acid compound or an aqueous hydrogen peroxide containing an adduct of a phosphoric acid compound and a tungstic acid compound, followed by the addition of a dicyclopentadiene (meth) acrylate polymer. Document 4 also describes an epoxidation method wherein a solution of an onium salt and a dicyclopentadiene (meth)acrylate polymer in a water insoluble organic solvent was mixed with an aqueous hydrogen peroxide containing a phosphoric acid compound and a tungstic acid compound or an aqueous hydrogen peroxide containing an adduct of a phosphoric acid compound and a tungstic acid compound. However, continuous generation of oxygen was observed during the epoxidation, because hydrogen peroxide and a tungstic acid compound were mixed before the addition of a dicyclopentadiene (meth)acrylate polymer. This causes a problem of safety. In addition, it is necessary to use hydrogen peroxide in a large amount.

Thus, documents 1 to 4 fail to give an industrially advantageous process for producing a polymer with an epoxy group.

SUMMARY OF THE INVENTION

It is an object of the present invention to provide an industrially advantageous process for producing an epoxidized polymer with safety and efficiency.

The present inventors have made intensive studies, to achieve the above object, especially on the method described in documents 1 to 4. Many papers other than the above documents have been published on epoxidation using a tungstic acid compound, a phosphoric acid compound and hydrogen peroxide under the presence of a quaternary ammonium salt, including the active species involved the epoxidation. However, details of such epoxidation reaction is not completely understood. So, a large number of trials are still required to establish the best condition for the epoxidation reaction according to a purpose.

Finally, the present inventors have found that, when all the following conditions indicated as (a) to (d) are fulfilled, decomposition of hydrogen peroxide can be suppressed, the ratio of the epoxidized carbon-carbon double bond of the starting polymer can be increased and the epoxidized polymer can be present with good stability in the reaction mixture. In addition, the present inventors have found that, in such a case, isolation of the epoxidized polymer can be performed easily and efficiently, because the obtained reaction mixture has good tendency to separate into two phases of an aqueous layer and an organic layer.

(a) To prepare an aqueous solution containing (i) ammonium tungstate and/or tungstophosphoric acid, which is the tungstic acid compound, and (ii) phosphoric acid, which is the phosphoric acid compound.

(b) To set the proportion of above (i) ammonium tungstate and/or tungstophosphoric acid and above (ii) phosphoric acid within a specific range.

(c) To effect the epoxidation reaction by adding the aqueous solution prepared in above (a) and an aqueous hydrogen peroxide to a solution of a quaternary ammonium salt and a polymer having an olefinic carbon-carbon double bond in an organic solvent immiscible with water.

(d) To effect the epoxidation reaction under the presence of substantially no alkali metal ion.

Specifically, the present invention provides a process for producing an epoxidized polymer, wherein the epoxidation of a polymer having an olefinic carbon-carbon double bond is effected under the presence of substantially no alkali metal ion by adding an aqueous solution containing (i) ammonium tungstate and/or tungstophosphoric acid and (ii) phosphoric acid, in which the amount of (ii) phosphoric acid is not less than 0.25 moles relative to 1 gram atom of tungsten atom contained in the (i) ammonium tungstate and/or tungstophosphoric acid, and an aqueous hydrogen peroxide, separately to a solution of said polymer and a quaternary ammonium salt in an organic solvent immiscible with water.

DETAILED DESCRIPTION OF THE PREFERRED EMBODIMENTS

In the present invention, a "polymer" can include an "oligomer".

The polymer having an olefinic carbon-carbon double bond may contain the olefinic carbon-carbon double bond of 1 to 100 mol % based on all the monomer units in the polymer.

Each olefinic carbon-carbon double bond may be either of cis or trans form. There is no particular restriction on the distribution of the olefinic carbon-carbon double bonds in the polymer having olefinic carbon-carbon double bonds. The type of distribution can be regular, block-like, random or tapered-like. The distribution may be mixed type of two or more of the above type.

When the polymer having olefinic carbon-carbon double bond has a side chain, the olefinic carbon-carbon double bond may locate at the main chain of the polymer, the side chain of the polymer or both of them. From the point of the stability of the epoxidized polymer, it is preferred that at least 50 mol % of all the olefinic carbon-carbon double bonds is located at the main chain of the polymer.

A polymer having an olefinic carbon-carbon double bond may be one produced by a known polymerization method such as a radical polymerization, an ionic polymerization, a coordination polymerization and a metathesis polymerization.

Examples of the polymer having an olefinic carbon-carbon double bond include polydienes such as a polybutadiene and a polyisoprene; polyalkenes obtained by ring-opening methathesis polymerization of a cycloalkene such as cyclopentene, cyclohexene and cyclooctene; block copolymers which contains a polymer block of a diene, such as an isoprene-butadiene diblock copolymer, a styrene-butadiene diblock copolymer, a styrene-isoprene diblock copolymer, a styrene-butadiene-styrene triblock copolymer, a styrene-isoprene-styrene triblock copolymer and a styrene-(isoprene/butadiene)-styrene triblock copolymer; random copolymers of a diene and another monomer, such as a styrene-butadiene random copolymer and a styrene-isoprene random copolymer; and copolymers having tapered structure such as a styrene-butadiene tapered copolymer. The polymer having an olefinic carbon-carbon double bond may be a partially hydrogenated product of the above described polymers. The polymer having an olefinic carbon-carbon double bond can contain, in a molecular chain or at a polymer end, a functional group such as hydroxy group, an alkoxy group, carbonyl group, carboxyl group, an ester group, an amide group and a halogen atom.

The number average molecular weight of the polymer having an olefinic carbon-carbon double bond can range preferably from 1,000 to 1,000,000.

According to the present invention, ammonium tungstate and/or tungstophosphoric acid is used as the tungstic acid compound, and phosphoric acid is used as the phosphoric acid compound. The combined use of these compound can achieve excellent phase separation of the reaction mixture, at the completion of the epoxidation reaction, and efficient production of an epoxidized polymer. The amount of ammonium tungstate and/or tungstophosphoric acid is preferably 0.0001 to 0.05 moles, more preferably 0.0001 to 0.02 moles, relative to 1 mole of the olefinic carbon-carbon double bond contained in the polymer having said double bonds.

According to the present invention, an aqueous solution containing (i) ammonium tungstate and/or tungstophosphoric acid and (ii) phosphoric acid is prepared. This procedure will form a tungsten complex as a precursor of the active species in the epoxidation reaction.

The amount of phosphoric acid is set to be not less than 0.25 moles relative to 1 gram atom of tungsten atom contained in the tungstic acid compound. When the amount of the phosphoric acid is less than 0.25 moles relative to 1 gram atom of tungsten atom, the reaction rate of the epoxidation reaction and the lifetime of the catalyst involved by the epoxidation reaction may be reduced to result in the low efficiency in the production of epoxidized polymer. The phosphoric acid is used preferably in an amount of not less than 0.5 moles relative to 1 gram atom of tungsten atom contained in the tungstic acid compound. There is no particular restriction on the upper limit of the amount of the phosphoric acid. However, from the point of the stability of the epoxidized polymer under the reaction condition and the tendency of phase separation of the reaction mixture at the completion of the epoxidation reaction, the phosphoric acid is used in an amount of preferably not more than 20 moles, more preferably not more than 10 moles, relative to 1 gram atom of tungsten atom contained in the tungstic acid compound.

With preparation of the aqueous solution containing (i) ammonium tungstate and/or tungstophosphoric acid and (ii) phosphoric acid, water is used in an amount of preferably 1 to 1000 times by weight, more preferably 10 to 500 times by weight, based on the weight of the tungstic acid compound in order to keep the pH of said aqueous solution within an appropriate range. The aqueous solution containing tungstic acid compound and phosphoric acid is preferably prepared at the temperature of 10 to 80° C.

The pH of the aqueous solution containing (i) ammonium tungstate and/or tungstophosphoric acid and (ii) phosphoric acid is preferably set between 0.1 and 4.5. From the point of reaction rate and processability, the pH of the aqueous solution is more preferably set between 0.5 and 4. When the pH of the aqueous solution containing (i) ammonium tungstate and/or tungstophosphoric acid and (ii) phosphoric acid is less than 0.1, that is more acidic, the epoxidation reaction proceeds so violent that it is difficult to control, and the stability of the epoxidized polymer under the reaction condition may be decreased. While the pH of the aqueous solution is more than 4.5, hydrogen peroxide tends to be decomposed and the ratio of the hydrogen peroxide contributed to the epoxidation of the olefinic carbon-carbon double bond of a polymer may be remarkably reduced.

The quaternary ammonium salt is preferably insoluble to water in view of an efficiency of epoxidation. Examples of the quaternary ammonium salt include tetrapentylammonium chloride, tetrahexylammonium chloride, tetraheptylammonium chloride, tetraoctylammonium chloride, trihexylmethylammonium chloride, trihexylethylammonium chloride, trihexylpropylammonium chloride, triheptylmethylammonium chloride, triheptylethylammonium chloride, triheptylpropylammonium chloride, trioctylmethylammonium chloride, trioctylethylammonium chloride, trioctylpropylammonium chloride, tetrapentylammonium bromide, tetrahexylammonium bromide, tetraheptylammonium bromide, tetraoctylammonium bromide, trihexylmethylammonium bromide, trihexylethylammonium bromide, trihexylpropylammonium bromide, triheptylmethylammonium bromide, triheptylethylammonium bromide, triheptylpropylammonium bromide, trioctylmethylammonium bromide, trioctylethylammonium bromide, trioctylpropylammonium bromide, tetrapentylammonium iodide, tetrahexylammonium iodide, tetraheptylammonium iodide, tetraoctylammonium iodide, trihexylmethylammonium iodide, trihexylethylammonium iodide, trihexylpropylammonium iodide, triheptylmethylammonium iodide, triheptylethylammonium iodide, triheptylpropylammonium iodide, trioctylmethylammonium iodide, trioctylethylammonium iodide, trioctylpropylammonium iodide, tetrapentylammonium hydrogen sulfate, tetrahexylammonium hydrogen sulfate, tetraheptylammonium hydrogen sulfate, tetraoctylammonium hydrogen sulfate, trihexylmethylammonium hydrogen sulfate, trihexylethylammonium hydrogen sulfate, trihexylpropylammonium hydrogen sulfate, triheptylmethylammonium hydrogen sulfate, triheptylethylammonium hydrogen sulfate, triheptylpropylammonium hydrogen sulfate, trioctylmethylammonium hydrogen sulfate, trioctylethylammonium hydrogen sulfate and trioctylpropylammonium hydrogen sulfate. Among them, trioctylmethylammonium chloride, trioctymethylammonium bromide, trioctylmethylammonium iodide and trioctylmethylammonium hydrogen sulfate are preferable.

There is no particular restriction on the amount of the quaternary ammonium salt. From the point of cost for production of the epoxidized polymer and the tendency of phase separation of the reaction mixture at the completion of the epoxidation reaction, the amount of the quaternary ammonium salt is preferably 0.01 to 10 moles, more preferably 0.01 to 5 moles, still more preferably 0.1 to 3 moles, relative to 1 gram atom of tungsten atom contained in the tungstic acid compound.

The quaternary ammonium salt is used as a solution of an organic solvent immiscible with water. When the quaternary ammonium salt is added directly, without dissolving into an organic solvent immiscible with water, to the aqueous solution containing (i) ammonium tungstate and/or tungstophosphoric acid and (ii) phosphoric acid, an insoluble tungsten compound is formed to remarkably inhibit the epoxidation reaction and the phase separation of the reaction mixture at the completion of the epoxidation reaction.

An organic solvent immiscible with water is not specifically limited so long as it does not inhibit the epoxidation reaction. Examples of such an organic solvent include aliphatic hydrocarbons such as pentane, hexane, heptane, octane, nonane, decane, cyclohexane, methylcyclohexane, cyclooctane and 2,6-dimethylcyclooctane; and aromatic hydrocarbons such as benzene, toluene, xylene, mesitylene, ethylbenzene and cumene. Among them, preferred solvent is hexane, heptane, octane, cyclohexane, toluene or xylene.

Amount of such an organic solvent, which depends on the solubility of the polymer having an olefinic carbon-carbon double bond into said solvent, can range generally from 0.1 to 200 times by weight based on the weight of the polymer. From the point of reaction rate and processability, amount of such an organic solvent ranges preferably 1 to 100 times by weight, more preferably 1 to 20 times by weight, based on the weight of the polymer.

As an aqueous hydrogen peroxide, commercially available one can be used as it is or after diluted with water. For example, an aqueous hydrogen peroxide at the concentration of 10 to 60% by weight is easily available in an industrial scale. There is no particular restriction on the concentration of hydrogen peroxide. From the point of the reaction efficiency and safety, the concentration of hydrogen peroxide is within a range of preferably between 0.01 and 60% by weight, more preferably between 0.1 and 50% by weight. The mount of hydrogen peroxide, which depends on the aimed amount of epoxy group in the epoxidized polymer, is preferably 0.001 to 10 moles, more preferably 0.03 to 1.2 moles, relative to 1 mole of the olefinic carbon-carbon double bond contained in the polymer which is subjected to the epoxidation reaction. For example, when the most of the olefinic carbon-carbon double bond in the polymer is aimed to be epoxidized, the amount of hydrogen peroxide is preferably 1 to 10 moles, more preferably 1 to 2 moles, still more preferably 1 to 1.2 moles, relative to 1 mole of the olefinic carbon-carbon double bond contained in the polymer.

According to the present invention, epoxidation of a polymer having an olefinic carbon-carbon double bond is effected by adding an aqueous solution containing (i) ammonium tungstate and/or tungstophosphoric acid and (ii) phosphoric acid and an aqueous hydrogen peroxide, separately to a solution of said polymer and a quaternary ammonium salt in an organic solvent immiscible with water. The method of addition is not particularly restricted. An aqueous solution containing (i) ammonium tungstate and/or tungstophosphoric acid and (ii) phosphoric acid and an aqueous hydrogen peroxide should not be mixed together before the addition to the organic solution containing the polymer and the quaternary ammonium salt. The addition of an aqueous hydrogen peroxide is preferably performed together with or after the addition of the solution containing (i) ammonium tungstate and/or tungstophosphoric acid and (ii) phosphoric acid.

The process according to the present invention is performed by, for example, adding an aqueous solution containing (i) ammonium tungstate and/or tungstophosphoric acid and (ii) phosphoric acid to a solution of a polymer having an olefinic carbon-carbon double bond and a quaternary ammonium salt in an organic solvent immiscible with water, followed by the addition of an aqueous hydrogen peroxide under vigorous agitation. In such a case, an aqueous hydrogen peroxide is preferably added after all of the aqueous solution containing (i) ammonium tungstate and/or tungstophosphoric acid and (ii) phosphoric acid is added to a solution of the polymer and a quaternary ammonium salt in an organic solvent.

The process according to the present invention may be performed by adding an aqueous solution containing (i) ammonium tungstate and/or tungstophosphoric acid and (ii) phosphoric acid and an aqueous hydrogen peroxide, simultaneously, to a solution of a polymer having an olefinic carbon-carbon double bond and a quaternary ammonium salt in an organic solvent immiscible with water.

Epoxidation reaction is required to be effected under the presence of substantially no alkali metal ion. An alkali metal ion present in the reaction mixture may cause a decomposition of hydrogen peroxide to increase the amount of hydrogen peroxide in use and increase the tendency of gelation of the reaction mixture. The phrase "under the presence of substantially no alkali metal ion" means that the amount of an alkali metal ion present in the reaction mixture is not more than 100 ppm based on the weight of the polymer having an olefinic carbon-carbon double bond.

The epoxidation reaction according to the present invention is preferably effected under the pressure of 80 kPa to 1 Mpa, in order to prevent the vaporation of a solvent. In addition, epoxidation reaction is preferably effected under inert gas such as nitrogen and argon, in view of reaction rate and safety.

The temperature of the epoxidation reaction is within the range of generally between 0 and 140° C., preferably between 40 and 100° C., more preferably between 50 and 100° C., in view of reaction rate and safety.

The present inventors have confirmed that a binuclear tungsten complex is present together with a small amount of tetranuclear tungsten complex in the reaction mixture of the process of the present invention. The present inventors have also confirmed that, in the reaction mixture of the processes described in the documents 1 to 4, a tetranuclear tungsten complex is present and a binuclear tungsten complex is not detected. Thus, the presence of a binuclear tungsten complex is a feature of the process of the present invention. The mechanism for the good results achieved by the present invention is not clearly discovered. However, the above feature is considered to make a contribution to the good results of the present invention.

The epoxidized polymer can be isolated from the reaction mixture by a conventional procedure. Typical procedure comprises steps of making the reaction mixture stand still to separate into an organic layer and an aqueous layer, removing the separated aqueous layer, washing the organic layer with water, an aqueous sodium hydrogen sulfite or an aqueous sodium sulfite, and finally subjecting the washed organic layer to the isolation method such as reprecipitation, removal of solvent under reduced pressure, removal of solvent with water, that is "steam stripping".

In order to increase the stability of the epoxidized polymer isolated, it is desirable to reduce the amount of tungsten compound contained in the epoxidized polymer. For this purpose, it is important to remove the catalyst involved in the epoxidation reaction efficiently through the isolation step.

The efficient removal of the catalyst can be done by making the organic layer, washed with water, an aqueous sodium hydrogen sulfite or an aqueous sodium sulfite, contact with an activated carbon or a basic substance.

An activated carbon may be one obtained from a material such as a coconut shell, a synthetic resin, coke and pitch. An activated carbon can be in a form of a powder, a granule, a fiber or a molded article.

Examples of a basic substance include a basic ion-exchange resin; zeolites that is exchanged such as Y-type zeolite in which a proton is exchanged with sodium or potassium ion; hydroxides of an alkali metal or alkaline earth metal such as sodium hydroxide, potassium hydroxide, calcium hydroxide and magnesium hydroxide; carbonates of an alkali metal or alkaline earth metal such as sodium carbonate, potassium carbonate and magnesium carbonate; bicarbonates of an alkali metal or alkaline earth metal such as sodium hydrogen carbonate and potassium hydrogen carbonate; alkali metal salts of an organic acid such as potassium acetate, sodium acetate, sodium propionate and potassium propionate; ammonia; organic bases such as methylamine, ethylamine, dimethylamine, diethylamine and trimethylamine. Among them, a basic ion-exchange resin, a carbonate of an alkali metal or alkaline earth metal, or a bicarbonate of an alkali metal or alkaline earth metal is preferable. Especially, a carbonate of an alkali metal or alkaline earth metal is more preferred. A basic substance is preferably used in the form of an aqueous solution, if it is water-soluble, in order to effect a contact with the organic layer and separation therefrom with efficiency.

An activated carbon or a basic substance is used in an amount of generally 1 to 100 times by weight based on the weight of ammonium tungstate and/or tungstophosphoric acid used in the epoxidation reaction. In view of the cost of production and processability, amount of an activated carbon or a basic substance is preferable between 5 and 50 times by weight based on the weight of ammonium tungstate and/or tungstophosphoric acid.

The epoxidized polymer can be isolated from the organic layer treated with an activated carbon or a basic substance by a conventional isolation method such as reprecipitation, removal of solvent under reduced pressure, removal of solvent with water, that is "steam stripping".

With regard to the epoxidized polymer obtained by the process of the present invention, the content of epoxy group is 1 to 100 mole % based on all the monomer units comprising the polymer. There is no particular restriction on the distribution of the epoxy groups in the epoxidized polymer. The type of distribution can be regular, block-like, random or tapered-like. The distribution may be mixed type of two or more of the above type. Epoxy groups may locate at the main chain of the polymer, the side chain of the polymer or both of them. From the point of the stability of the epoxidized polymer, it is preferred that at least 70 mol % of all the epoxy group is located at the main chain of the polymer. It is more preferred that at least 80 mol % of all the epoxy group is located at the main chain of the polymer.

Example of the epoxidized polymer obtained by the process of the present invention include epoxidized polydienes such as an epoxidized polybutadiene and an epoxidized polyisoprene; epoxidized products of polyalkenes obtained by ring-opening methathesis polymerization of a cycloalkene such as cyclopentene, cyclohexene and cyclooctene; epoxidized products of block copolymers which contains a polymer block of a diene, such as an isoprene-butadiene diblock copolymer, a styrene-butadiene diblock copolymer, a styrene-isoprene diblock copolymer, a styrene-butadiene-styrene triblock copolymer, a styrene-isoprene-styrene triblock copolymer and a styrene-(isoprene/butadiene)-styrene triblock copolymer; epoxidized products of random copolymers of a diene and another monomer, such as a styrene-butadiene random copolymer and a styrene-isoprene random copolymer; epoxidized products of copolymers having tapered structure such as a styrene-butadiene tapered copolymer; and epoxidized products of a partially hydrogenated polymer of such polydienes, polyalkenes, block copolymers, random copolymers and copolymers having tapered structure. Example of the epoxidized polymer obtained by the process of the present invention also include epoxidized products of unsaturated polyesters made of a dicarboxylic acid such as terephthalic acid and a unsaturated diol such as 1,4-dihydroxy-2-butene, or made of a unsaturated dicarboxylic acid such as tetrahydroterephthalic acid and a diol such as 1,4-butanediol; and epoxidized products of unsaturated polyamides made of a dicarboxylic acid such as terephthalic acid and a unsaturated diamine such as 1,4-diamino-2-butene, or made of a unsaturated dicarboxylic acid such as tetrahydrophthalic acid and a diamine such as 1,4-butanediamine.

EXAMPLES

Now, the invention is described in more detail hereinbelow with reference to the following Examples and Comparative Examples, which are provided for the purposes of illustration only and are not intended to restrict the scope of the invention.

Example 1

A three necked flask of 300 ml equipped with a refluxing condenser, a dropping funnel, a thermometer and a mechanical stirrer was charged with 25 g of polyisoprene ["LIR-15", product of KURARAY Co., LTD., having number-average molecular weight of 15,000], 0.32 g of trioctylmethylammonium chloride and 100 g of toluene. The polymer charged was dissolved under agitation at 60° C., and the obtained solution was warmed to 70° C. A solution, having pH of 3.1, of 0.15 g (0.05 mmol) of ammonium tungstate and 0.33 g (3.3 mmol) of phosphoric acid in 20 g of water was added to the above toluene solution at 70° C. To the obtained mixture, 37.4 g of 30% aqueous hydrogen peroxide (0.33 mol) was added dropwise for 3 hours under vigorous agitation at 70° C. After the completion of addition of hydrogen peroxide, the resulting mixture was agitated for 4 hours at 70° C. The agitation was stopped, and the reaction mixture was stood still at 60° C. to effect phase separation into organic layer and aqueous layer. The time for the phase separation was about 3 minutes. The organic layer was collected and washed with 100 ml of water, 100 ml of 5%, aqueous sodium carbonate and 100 ml of water in twice, respectively. Toluene was removed from the obtained organic layer under reduced pressure. Drying of the residue for 8 hours at 80° C. under 800 Pa. gave 30 g of epoxidized polyisoprene. Analysis of the product with $^1$H-NMR showed that conversion of the carbon-carbon double bond of polyisoprene and the ratio of the carbon-carbon double bond epoxidized were 89% and 88%, respectively. Selectivity to the epoxidized product was 99%. 98% of hydrogen peroxide added was utilized for the epoxidation of polyisoprene.

The content of tungsten in the epoxidized polyisoprene was determined to be 21.1 ppm by the following procedure.
General Procedure for the Determination of Tungsten Content in the Epoxidized Polymer 2 g of epoxidized polymer was put into a crucible of platinum and incinerated by heating at 500° C. for 3 hours and further heating at 600° C. After cooling to room temperature, 2 g of sodium carbonate was added to the crucible. The obtained mixture was heated under air at 400° C. for 30 minutes, at 600° C. for 30 minutes, at 800° C. for 1 hour and at 900° C. for 1 hour. After cooling to room temperature, the residue was diluted with water. The obtained solution was adjusted to 100 ml in volume with water and subjected to ICP spectrometry to determine the tungsten content.

Example 2

A three necked flask of 300 ml equipped with a refluxing condenser, a dropping funnel, a thermometer and a mechanical stirrer was charged with 25 g of polyisoprene ["LIR-15", product of KURARAY Co., LTD., having number-average molecular weight of 15,000], 0.32 g of trioctylmethylammonium chloride and 100 g of toluene. The polymer charged was dissolved under agitation at 60° C., and the obtained solution was warmed to 70° C. A solution, having pH of 2.5, of 0.11 g (0.04 mmol) of tungstophosphoric acid and 0.02 g (0.20 mmol) of phosphoric acid in 10 g of water was added to the above toluene solution at 70° C. To the obtained mixture, 37.4 g of 30% aqueous hydrogen peroxide (0.33 mol) was added dropwise for 3 hours under vigorous agitation at 70° C. After the completion of addition of hydrogen peroxide, the resulting mixture was agitated for 4 hours at 70° C. The agitation was stopped, and the reaction mixture was stood still at 60° C. to effect phase separation into organic layer and aqueous layer. The time for the phase separation was about 1 minute. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 80° C. under 800 Pa. gave 30 g of epoxidized polyisoprene. Analysis of the product with $^1$H-NMR showed that conversion of the carbon-carbon double bond of polyisoprene and the ratio of the carbon-carbon double bond epoxidized were 88% and 87%, respectively. Selectivity to the epoxidized product was 99%. 97% of the hydrogen peroxide added was utilized for the epoxidation of polyisoprene.

The content of tungsten in the epoxidized polyisoprene was determined to be 12.1 ppm by the general procedure described above.

Comparative Example 1

The procedures of Example 1 were repeated except that 0.13 g (0.44 mmol) of sodium tungstate was used instead of 0.15 g of ammonium tungstate. A component insoluble with the organic layer and the aqueous layer was formed during the epoxidation reaction. It took about 15 minutes for the reaction mixture to separate into an organic layer and an aqueous layer at 60° C. Conversion of the carbon-carbon double bond of polyisoprene and the ratio of the carbon-carbon double bond epoxidized were 94% and 82%, respectively. Selectivity to the epoxidized product was 87%. 91% of the hydrogen peroxide added was utilized for the epoxidation of polyisoprene.

The content of tungsten in the epoxidized polyisoprene was determined to be 112 ppm by the general procedure described above.

This indicates that the use of ammonium tungstate or tungstophosphoric acid makes the time for phase separation of the reaction mixture short and efficient.

Comparative Example 2

The procedures of Example 1 were repeated except that polyisoprene, ammonium tungstate, phosphoric acid, trioctylmethylammonium chloride, toluene and water were put into a flask all at once. The obtained reaction mixture did not separate into two phase because of gelation. Epoxidized polyisoprene could not be isolated.

Comparative Example 3

A three necked flask of 300 ml equipped with a refluxing condenser, a dropping funnel, a thermometer and a mechanical stirrer was charged with 25 g of polyisoprene ["LIR-15", product of KURARAY Co., LTD., having number-average molecular weight of 15,000], 0.32 g of trioctylmethylammonium chloride and 100 g of toluene. The polymer charged was dissolved under agitation at 60° C., and the obtained solution was warmed to 70° C. A solution, having pH of 5.1, of 0.15 g (0.05 mmol) of ammonium tungstate, 0.33 g (3.3 mmol) of phosphoric acid and 0.07 g (0.66 mmol) of sodium carbonate in 20 g of water was added to the above toluene solution at 70° C. To the obtained mixture, 37.4 g of 30% aqueous hydrogen peroxide (0.33 mol) was added dropwise for 3 hours under vigorous agitation at 70° C. After the completion of addition of hydrogen peroxide, the resulting mixture was agitated for 9 hours at 70° C. The agitation was stopped, and the reaction mixture was stood still at 60° C. to effect phase separation into organic layer and aqueous layer. The time for the phase separation was about 54 minutes. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 80° C. under 800 Pa. gave 30 g of epoxidized polyisoprene. Analysis of the product with $^1$H-NMR showed that conversion of the carbon-carbon double bond of polyisoprene and the ratio of the carbon-carbon double bond epoxidized were 91% and 73%, respectively. Selectivity to the epoxidized product was 80%. 72% of hydrogen peroxide added was utilized for the epoxidation of polyisoprene.

The content of tungsten in the epoxidized polyisoprene was determined to be 29.1 ppm by the general procedure described above.

Comparative Example 4

A three necked flask of 300 ml equipped with a refluxing condenser, a dropping funnel, a thermometer and a mechanical stirrer was charged with 25 g of polyisoprene ["LIR-15", product of KURARAY Co., LTD., having number-average molecular weight of 15,000], 0.32 g of trioctylmethylammonium chloride and 100 g of toluene. The polymer charged was dissolved under agitation at 60° C., and the obtained solution was warmed to 70° C. A solution, having pH of 4.2, of 0.15 g (0.05 mmol) of ammonium tungstate and 9.4 mg (0.01 mmol) of phosphoric acid in 20 g of water was added to the above toluene solution at 70° C. To the obtained mixture, 37.4 g of 30% aqueous hydrogen peroxide (0.33 mol) was added dropwise for 3 hours under vigorous agitation at 70° C. After the completion of addition of hydrogen peroxide, the resulting mixture was agitated for 6 hours at 70° C. The agitation was stopped, and the reaction mixture was stood still at 60° C. to effect phase separation into organic layer and aqueous layer. The time for the phase separation was about 12 minutes. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 80° C. under 800 Pa. gave 30 g of epoxidized polyisoprene. Analysis of the product with $^1$H-NMR showed that conversion of the carbon-carbon double bond of polyisoprene and the ratio of the carbon-carbon double bond epoxidized were 83% and 80%, respectively. Selectivity to the epoxidized product was 96%. 81% of hydrogen peroxide added was utilized for the epoxidation of polyisoprene.

The content of tungsten in the epoxidized polyisoprene was determined to be 29.4 ppm by the general procedure described above.

Example 3

A three necked flask of 300 ml equipped with a refluxing condenser, a dropping funnel, a thermometer and a mechanical stirrer was charged with 25 g of polyisoprene ["LIR-15", product of KURARAY Co., LTD., having number-average molecular weight of 15,000], 0.32 g of trioctylmethylammonium chloride and 100 g of toluene. The polymer charged was dissolved under agitation at 60° C., and the obtained solution was warmed to 70° C. A solution, having pH of 3.1, of 0.125 g (0.04 mmol) of ammonium tungstate pentahydrate and 0.33 g (3.3 mmol) of phosphoric acid in 20 g of water was added to the above toluene solution at 70° C. To the obtained mixture, 2.26 g of 30% aqueous hydrogen peroxide (0.02 mol) was added dropwise for 0.5 hours under vigorous agitation at 70° C. After the completion of addition of hydrogen peroxide, the resulting mixture was agitated for 1 hour at 70° C. The agitation was stopped, and the reaction mixture was stood still at 60° C. to effect phase separation into organic layer and aqueous layer. The time for the phase separation was about 0.5 minute. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 80° C. under 800 Pa. gave 25.5 g of epoxidized polyisoprene. Analysis of the product with $^1$H-NMR showed that conversion of the carbon-carbon double bond of polyisoprene and the ratio of the carbon-carbon double bond epoxidized were 5.3% and 5.3%, respectively. Selectivity to the epoxidized product was 100%. 98% of hydrogen peroxide added was utilized for the epoxidation of polyisoprene.

The content of tungsten in the epoxidized polyisoprene was determined to be 1.2 ppm by the general procedure described above.

Example 4

A three necked flask of 300 ml equipped with a refluxing condenser, two dropping funnels, a thermometer and a mechanical stirrer was charged with 25 g of polyisoprene ["LIR-15", product of KURARAY Co., LTD., having number-average molecular weight of 15,000], 0.32 g of trioctylmethylammonium chloride and 100 g of toluene. The polymer charged was dissolved under agitation at 60° C., and the obtained solution was warmed to 70° C. A solution, having pH of 3.1, of 0.125 g (0.04 mmol) of ammonium tungstate pentahydrate and 0.33 g (3.3 mmol) of phosphoric acid in 20 g of water, and 37.4 g of 30% aqueous hydrogen peroxide (0.33 mol) were each added dropwise, separately and simultaneously, through different dropping funnel, to the above toluene solution for 3 hours under vigorous agitation at 70° C. After the completion of addition, the resulting mixture was agitated for 4 hours at 70° C. The agitation was stopped, and the reaction mixture was stood still at 60° C. to effect phase separation into organic layer and aqueous layer. The time for the phase separation was about 1.5 minutes. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 80° C. under 800 Pa. gave 30 g of epoxidized polyisoprene. Analysis of the product with $^1$H-NMR showed that conversion of the carbon-carbon double bond of polyisoprene and the ratio of the carbon-carbon double bond epoxidized were 88% and 88%, respectively. Selectivity to the epoxidized product was 100%. 99% of hydrogen peroxide added was utilized for the epoxidation of polyisoprene.

The content of tungsten in the epoxidized polyisoprene was determined to be 13.1 ppm by the general procedure described above.

Comparative Example 5

A three necked flask of 300 ml equipped with a refluxing condenser, a dropping funnel, a thermometer and a mechanical stirrer was charged with 25 g of polyisoprene ["LIR-15", product of KURARAY Co., LTD., having number-average molecular weight of 15,000], 0.32 g of trioctylmethylammonium chloride and 100 g of toluene. The polymer charged was dissolved under agitation at 60° C., and the obtained solution was warmed to 70° C. 37.4 g of 30% aqueous hydrogen peroxide (0.33 mol) was added to a solution, having pH of 3.1, of 0.125 g (0.04 mmol) of ammonium tungstate pentahydrate and 0.33 g (3.3 mmol) of phosphoric acid in 20 g of water to give a solution containing tungsten compound. The solution containing tungsten compound thus obtained was added dropwise to the above toluene solution for 3 hours under vigorous agitation at 70° C. Generation of oxygen was observed during the preparation and addition of the solution containing tungsten compound. After the completion of addition, the resulting mixture was agitated for 4 hours at 70° C. The agitation was stopped, and the reaction mixture was stood still at 60° C. to effect phase separation into organic layer and aqueous layer. The time for the phase separation was about 1.5 minutes. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 80° C. under 800 Pa. gave 28 g of epoxidized polyisoprene. Analysis of the product with $^1$H-NMR showed that conversion of the carbon-carbon double bond of polyisoprene and the ratio of the carbon-carbon double bond epoxidized were 71% and 66%, respectively. Selectivity to the epoxidized product was 93%. 42% of hydrogen peroxide added was utilized for the epoxidation of polyisoprene.

The content of tungsten in the epoxidized polyisoprene was determined to be 11.4 ppm by the general procedure described above.

Example 5

A three necked flask of 300 ml equipped with a refluxing condenser, a dropping funnel, a thermometer and a mechanical stirrer was charged with 25 g of styrene-isoprene-styrene triblock copolymer having styrene content of 32% by weight and number-average molecular weight of 30,000, 0.20 g of trioctylmethylammonium chloride and 100 g of toluene. The polymer charged was dissolved under agitation at 60° C., and the obtained solution was warmed to 70° C. A solution, having pH of 3.3, of 0.093 g (0.03 mmol) of ammonium tungstate pentahydrate and 0.22 g (2.2 mmol) of phosphoric acid in 20 g of water was added to the above toluene solution at 70° C. To the obtained mixture, 26.9 g of 30% aqueous hydrogen peroxide (0.23 mol) was added dropwise for 3 hours under vigorous agitation at 70° C. After the completion of addition of hydrogen peroxide, the resulting mixture was agitated for 8 hours at 70° C. The agitation was stopped, and the reaction mixture was stood still at 60° C. to effect phase separation into organic layer and aqueous layer. The time for the phase separation was about 1 minute. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 80° C. under 800 Pa. gave 29 g of epoxidized styrene-isoprene-styrene triblock copolymer. Analysis of the product with $^1$H-NMR showed that conversion of the olefinic carbon-carbon double bond of the triblock copolymer and the ratio of the olefinic carbon-carbon double bond epoxidized were 92% and 91%, respectively. Selectivity to the epoxidized product was 99%. 96% of hydrogen peroxide added was utilized for the epoxidation of the triblock copolymer.

The content of tungsten in the epoxidized styrene-isoprene-styrene triblock copolymer was determined to be 9 ppm by the general procedure described above.

Example 6

A three necked flask of 300 ml equipped with a refluxing condenser, a dropping funnel, a thermometer and a mechanical stirrer was charged with 25 g of polyoctenylene [Product of Huls America Inc.; having number-average molecular weight of 60,000], 0.15 g of trioctylmethylammonium chloride and 100 g of toluene. The polymer charged was dissolved under agitation at 70° C., and the obtained solution was warmed to 80° C. A solution, having pH of 3.5, of 0.078 g (0.025 mmol) of ammonium tungstate pentahydrate and 0.17 g (1.7 mmol) of phosphoric acid in 20 g of water was added to the above toluene solution at 80° C. To the obtained mixture, 26.2 g of 30% aqueous hydrogen peroxide (0.23 mol) was added dropwise for 3 hours under vigorous agitation at 80° C. After the completion of addition of hydrogen peroxide, the resulting mixture was agitated for 6 hours at 80° C. The agitation was stopped, and the reaction mixture was stood still at 60° C. to effect phase separation into organic layer and aqueous layer. The time for the phase separation was about 2 minutes. The organic layer was collected and washed with 100 ml of water. 12 g of activated carbon ["YP-17"; product of Kuraray Chemical Co., Ltd.] was added to the washed organic layer. After stirred for 1 hour at 50° C., the obtained mixture was filtered to remove the activated carbon. Toluene was removed from the obtained filtrate under reduced pressure. Drying of the residue for 8 hours at 80° C. under 800 Pa. gave 28 g of epoxidized polyoctenylene. Analysis of the product with $^1$H-NMR showed that conversion of the carbon-carbon double bond of the polyoctenylene and the ratio of the carbon-carbon double bond epoxidized were 100% and 100%, respectively. Selectivity to the epoxidized product was 100%. 99% of hydrogen peroxide added was utilized for the epoxidation of the polyoctenylene.

The content of tungsten in the epoxidized polyoctenylene was determined to be 7.3 ppm by the general procedure described above.

Example 7

A three necked flask of 300 ml equipped with a refluxing condenser, a dropping funnel, a thermometer and a mechanical stirrer was charged with 25 g of cis-polybutadiene ["Nipol-BR"; product of Zeon Corporation, having number-average molecular weight of 30,000], 0.32 g of trioctylmethylammonium chloride and 100 g of cyclohexane. The polymer charged was dissolved under agitation at 60° C., and the obtained solution was warmed to 70° C. A solution, having pH of 3.1, of 0.15 g (0.05 mmol) of ammonium tungstate and 0.33 g (3.3 mmol) of phosphoric acid in 20 g of water was added to the above cyclohexane solution at 70° C. To the obtained mixture, 52.1 g of 30% aqueous hydrogen peroxide (0.46 mol) was added dropwise for 4 hours under vigorous agitation at 70° C. After the completion of addition of hydrogen peroxide, the resulting mixture was agitated for 2 hours at 70° C. The agitation was stopped, and the reaction mixture was stood still at 60° C. to effect phase separation into organic layer and aqueous layer. The time for the phase separation was about 2.5 minutes. The organic layer was collected and washed with 100 ml of water, 100 ml of 5% aqueous sodium carbonate and 100 ml of water in twice, respectively. Cyclohexane was removed from the obtained organic layer under reduced pressure. Drying of the residue for 8 hours at 80° C. under 800 Pa. gave 33.2 g of epoxidized polybutadine. Analysis of the product with $^1$H-NMR showed that conversion of the carbon-carbon double bond of the cis-polybutadiene and the ratio of the carbon-carbon double bond epoxidized were 100% and 98.5%, respectively. Selectivity to the epoxidized product was 98%. 98% of hydrogen peroxide added was utilized for the epoxidation of cis-polybutadiene.

The content of tungsten in the epoxidized cis-polybutadiene was determined to be 14.1 ppm by the general procedure described above.

In the above epoxidation reaction, a small portion of the reaction mixture was sampled, at the time when 1 hour had passed after the completion of addition of hydrogen peroxide, which was analyzed by $^{31}$P-NMR to show the peaks corresponding to the complexes represented by the following formulas (x) and (y):

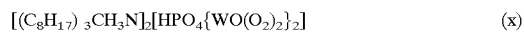

$[(C_8H_{17})_3CH_3N]_2[HPO_4\{WO(O_2)_2\}_2]$      (x)

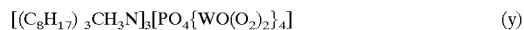

$[(C_8H_{17})_3CH_3N]_3[PO_4\{WO(O_2)_2\}_4]$      (y)

$^{31}$P-NMR spectra was assigned with reference to those of authentic samples of the complexes represented by the above formulas (x) and (y), which were prepared by the known procedures [see "Inorganic Chemistry, 30, 4409–4415 (1991)" and "Inorganic Chemistry, 33, 871–878 (1994)"].

Comparative Example 6

The procedures of Example 7 were repeated except that cis-polybutadiene, ammonium tungstate, phosphoric acid, trioctylmethylammonium chloride, cyclohexane and water were put into a flask all at once. The obtained reaction mixture did not separate into two phases because of its gelation. Epoxidized polybutadiene could not be isolated.

Comparative Example 7

A three necked flask of 300 ml equipped with a refluxing condenser, a dropping funnel, a thermometer and a mechanical stirrer was charged with 25 g of cis-polybutadiene ["Nipol-BR"; product of Zeon Corporation, having number-average molecular weight of 30,000], 0.32 g of trioctylmethylammonium chloride and 114 g of chloroform. The polymer charged was dissolved under agitation at 60° C., and the obtained solution was warmed to 70° C. A solution, having pH of 3.3, of 0.11 g (0.33 mmol) of sodium tungstate and 0.06 g (0.6 mmol) of phosphoric acid in 10 g of water was added to the above chloroform solution at 70° C. To the obtained mixture, 10.2 g of 30% aqueous hydrogen peroxide (0.09 mol) was added dropwise for 4 hours under vigorous agitation at 70° C. After the completion of addition of hydrogen peroxide, the resulting mixture was agitated for 12 hours at 80° C. The agitation was stopped, and the reaction mixture was stood still at 60° C. to effect phase separation into organic layer and aqueous layer. The time for the phase separation was about 18 minutes. The organic layer was collected and washed with 100 ml of water, 100 ml of 5% aqueous sodium carbonate and 100 ml of water in twice, respectively. Chloroform was removed from the obtained organic layer under reduced pressure. Drying of the residue for 8 hours at 80° C. under 800 Pa. gave 25.8 g of epoxidized polybutadine. Analysis of the product with $^1$H-NMR showed that conversion of the carbon-carbon double bond of the cis-polybutadiene and the ratio of the carbon-carbon double bond epoxidized were 19% and 17%, respectively. Selectivity to the epoxidized product was 89%. 88% of hydrogen peroxide added was utilized for the epoxidation of cis-polybutadiene.

The content of tungsten in the epoxidized cis-polybutadiene was determined to be 31.4 ppm by the general procedure described above.

In the above epoxidation reaction, a small portion of the reaction mixture was sampled, at the time when 1 hour had passed after the completion of addition of hydrogen peroxide, which was analyzed by $^{31}$P-NMR to show the peak corresponding to the complex represented by the above described formula (y). However, a peak corresponding to the complex represented by the above described formula (x) was not detected.

Comparative Example 8

A three necked flask of 300 ml equipped with a refluxing condenser, a dropping funnel, a thermometer and a mechanical stirrer was charged with 25 g of cis-polybutadiene ["Nipol-BR"; product of Zeon Corporation, having number-average molecular weight of 30,000], 0.32 g of trioctylmethylammonium chloride and 114 g of chloroform. The polymer charged was dissolved under agitation at 60° C., and the obtained solution was warmed to 70° C. A solution, having pH of 3.3, of 0.11 g (0.33 mmol) of sodium tungstate and 0.06 g (0.6 mmol) of phosphoric acid in 10 g of water was added to the above chloroform solution at 70° C. To the obtained mixture, 52.1 g of 30% aqueous hydrogen peroxide (0.46 mol) was added dropwise for 4 hours under vigorous agitation at 70° C. After the completion of addition of hydrogen peroxide, the resulting mixture was agitated for 2 hours at 70° C. The obtained reaction mixture did not separate into two phases because of its gelation. Epoxidized polybutadiene could not be isolated.

Referential Example 1

Synthesis of poly[diglycidyl (cyclohexanedimethyl) tetrahydrophthalate]

A three necked flask of 500 ml equipped with a refluxing condenser, a dropping funnel and a mechanical stirrer was charged with 41.2 g (0.29 mol) of 1,4-cyclohexane dimethanol, 88.5 g (0.58 mol) of tetrahydrophthalic anhydride and 150 g of toluene. The obtained solution was heated to 120° C. for 5 hours. After cooling to room temperature, 0.8 g (0.004 mol) of benzyltrimethylammonium chloride and 41 g of 85% powdery sodium hydroxide (0.85 mol) were added successively to the reaction mixture. To the resulting mixture, 66.9 g (0.7 mol) of epichlorohydrin was added dropwise at 40° C. for 8 hours, followed by further agitation at 40° C. for 5 hours. The reaction mixture was washed with water. Removal of a material having low boiling point by distillation under reduced pressure gave 132.5 g of poly[diglycidyl (cyclohexanedimethyl) tetrahydrophthalate] in 83% yield.

Example 8

A three necked flask of 300 ml equipped with a refluxing condenser, two dropping funnels, a thermometer and a mechanical stirrer was charged with 25 g (0.018 mol) of poly[diglycidyl (cyclohexanedimethyl)tetrahydrophthalate] obtained in Referential Example 1, 0.32 g of trioctylmethylammonium chloride and 100 g of toluene. The polymer charged was dissolved under agitation at 60° C., and the obtained solution was warmed to 70° C. A solution, having pH of 3.1, of 0.125 g (0.04 mmol) of ammonium tungstate pentahydrate and 0.33 g (3.3 mmol) of phosphoric acid in 20 g of water, and 9.06 g of 30% aqueous hydrogen peroxide (0.08 mol) were each added dropwise, separately and simultaneously, through different dropping funnel, to the above toluene solution for 3 hours under vigorous agitation at 70° C. After the completion of addition, the resulting mixture was agitated for 4 hours at 70° C. The agitation was stopped, and the reaction mixture was stood still at 60° C. to effect phase separation into organic layer and aqueous layer. The time for the phase separation was about 1.5 minute. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 60° C. under 800 Pa. gave 26 g of epoxidized of poly[diglycidyl (cyclohexanedimethyl) tetrahydrophthalate]. Analysis of the product with $^1$H-NMR showed that conversion of the carbon-carbon double bond of the starting compound and the ratio of the carbon-carbon double bond epoxidized were 100% and 98%, respectively. Selectivity to the epoxidized product was 98%. 99% of hydrogen peroxide added was utilized for the epoxidation of the starting compound.

The content of tungsten in the epoxidized product was determined to be 9.1 ppm by the general procedure described above.

Comparative Example 9

A three necked flask of 300 ml equipped with a refluxing condenser, a dropping funnel, a thermometer and a mechanical stirrer was charged with 25 g (0.018 mol) of poly [diglycidyl (cyclohexanedimethyl)tetrahydrophthalate] obtained in Referential Example 1, 0.09 g of cetylpyridinium chloride and 100 g of toluene. The polymer charged was dissolved under agitation at 60° C. A solution, having pH of 3, of 0.17 g (0.51 mmol) of sodium tungstate, 0.27 g (2.7 mmol) of phosphoric acid and 0.05 g (0.47 mmol) of sodium carbonate in 1.8 g of water was added to the above toluene solution at 60° C. To the obtained mixture, 9.05 g of 30% aqueous hydrogen peroxide (0.08 mol) was added dropwise for 3 hours under vigorous agitation at 60° C. After the completion of addition of hydrogen peroxide, the resulting mixture was agitated for 3 hours at 60° C. The agitation was stopped, and the reaction mixture was stood still at 60° C. to effect phase separation into organic layer and aqueous layer. The time for the phase separation was about 39.5 minutes. The organic layer was collected and washed with 100 ml of water, 100 ml of 5% aqueous sodium carbonate and 100 ml of water in twice, respectively. Toluene was removed from the obtained organic layer under reduced pressure. Drying of the residue for 8 hours at 60° C. under 800 Pa. gave 25.6 g of epoxidized of poly[diglycidyl (cyclohexanedimethyl)tetrahydrophthalate]. Analysis of the product with $^1$H-NMR showed that conversion of the carbon-carbon double bond of the starting compound and the ratio of the carbon-carbon double bond epoxidized were 95% and 71%, respectively. Selectivity to the epoxidized product was 75%. 70% of hydrogen peroxide added was utilized for the epoxidation of the starting compound.

The content of tungsten in the epoxidized product was determined to be 89.3 ppm by the general procedure described above.

Example 9

Procedures of Example 1 were repeated to effect the epoxidation of 25 g of polyisoprene ["LIR-15", product of KURARAY Co., LTD., having number-average molecular weight of 15,000]. The reaction mixture was stood still at 60° C. to effect phase separation into organic layer and aqueous layer. The organic layer was collected and washed with 100 ml of water by three times. Toluene was removed from the washed organic layer under reduced pressure. Drying of the residue for 8 hours at 80° C. under 800 Pa. gave 30 g of epoxidized of polyisoprene. Analysis of the product with $^1$H-NMR showed that conversion of the carbon-carbon double bond of the polyisoprene was 88%.

The content of tungsten in the epoxidized polyisoprene was determined to be 412 ppm by the general procedure described above.

Having now fully described the invention, it will be apparent to one of the ordinary skill in the art that many changes and modifications can be made thereto without departing from the spirit or scope of the invention as set forth herein.

This application is based on Japanese Patent Application No. 2000-388509, filed on Dec. 21, 2000, the entire contents of which are hereby incorporated by reference.

What is claimed is:

1. A process for producing an epoxidized polymer, wherein the epoxidation of a polymer having an olefinic carbon-carbon double bond is effected under the presence of substantially no alkali metal ion by adding an aqueous solution containing (i) ammonium tungstate and/or tungstophosphoric acid and (ii) phosphoric acid, in which the amount of (ii) phosphoric acid is not less than 0.25 moles relative to 1 gram atom of tungsten atom contained in the (i) ammonium tungstate and/or tungstophosphoric acid, and an aqueous hydrogen peroxide, separately to a solution of said polymer and a quaternary ammonium salt in an organic solvent immiscible with water.

2. The process of claim 1 wherein the organic solvent immiscible with water is an aliphatic hydrocarbon and/or aromatic hydrocarbon.

3. The process of claim 1 wherein the quaternary ammonium salt is insoluble to water.

4. The process of any one of claim 1 wherein the pH of the aqueous solution containing (i) ammonium tungstate and/or tungstophosphoric acid and (ii) phosphoric acid is 0.1 to 4.5.

5. The process of any one of claim 1 wherein the pH of the aqueous solution containing (i) ammonium tungstate and/or tungstophosphoric acid and (ii) phosphoric acid is 0.5 to 4.

6. A process for producing an epoxidized polymer, comprising the steps of:

epoxidizing a polymer having an olefinic carbon-carbon double bond under the presence of substantially no alkali metal ion by adding an aqueous solution containing (i) ammonium tungstate and/or tungstophosphoric acid and (ii) phosphoric acid, in which the amount of (ii) phosphoric acid is not less than 0.25 moles relative to 1 gram atom of tungsten atom contained in the (i) ammonium tungstate and/or tungstophosphoric acid, and an aqueous hydrogen peroxide, separately to a solution of said polymer and a quaternary ammonium salt in an organic solvent immiscible with water, and isolating the epoxidized polymer by subjecting the reaction mixture to phase separation into an aqueous layer and an organic layer containing the epoxidized polymer, collecting the organic layer and making the organic layer contact with an activated carbon or a basic substance.

* * * * *